(12) United States Patent
Han et al.

(10) Patent No.: US 9,981,346 B2
(45) Date of Patent: May 29, 2018

(54) WELDED JOINT OF EXTREMELY LOW-TEMPERATURE STEEL, AND WELDING MATERIALS FOR PREPARING SAME

(71) Applicant: POSCO, Pohang-si (KR)

(72) Inventors: Il-Wook Han, Pohang-si (KR); Jeong-Kil Kim, Pohang-si (KR); Bong-Keun Lee, Pohang-si (KR); Hong-Kil Lee, Pohang-si (KR)

(73) Assignee: POSCO Gyeongsangbuk-Do (KR)

( * ) Notice: Subject to any disclaimer, the term of this patent is extended or adjusted under 35 U.S.C. 154(b) by 281 days.

(21) Appl. No.: 14/442,505

(22) PCT Filed: Nov. 22, 2013

(86) PCT No.: PCT/KR2013/010696
§ 371 (c)(1),
(2) Date: May 13, 2015

(87) PCT Pub. No.: WO2014/081246
PCT Pub. Date: May 30, 2014

(65) Prior Publication Data
US 2016/0271736 A1    Sep. 22, 2016

(30) Foreign Application Priority Data

Nov. 22, 2012  (KR) ........................ 10-2012-0133244
Nov. 22, 2012  (KR) ........................ 10-2012-0133245
Nov. 27, 2012  (KR) ........................ 10-2012-0135518

(51) Int. Cl.
| | |
|---|---|
| B23K 35/02 | (2006.01) |
| B23K 35/24 | (2006.01) |
| C22C 38/00 | (2006.01) |
| C22C 38/50 | (2006.01) |
| C22C 38/58 | (2006.01) |
| B23K 35/30 | (2006.01) |
| B23K 35/36 | (2006.01) |
| C22C 38/04 | (2006.01) |
| C22C 38/08 | (2006.01) |
| C22C 38/10 | (2006.01) |
| C22C 38/12 | (2006.01) |
| C22C 38/14 | (2006.01) |
| C22C 38/18 | (2006.01) |
| C22C 38/20 | (2006.01) |
| C22C 38/22 | (2006.01) |
| C22C 38/24 | (2006.01) |
| C22C 38/26 | (2006.01) |
| C22C 38/28 | (2006.01) |
| C22C 38/30 | (2006.01) |
| C22C 38/40 | (2006.01) |

(Continued)

(52) U.S. Cl.
CPC .......... *B23K 35/0266* (2013.01); *B23K 9/173* (2013.01); *B23K 9/186* (2013.01); *B23K 35/0288* (2013.01); *B23K 35/24* (2013.01); *B23K 35/308* (2013.01); *B23K 35/3066* (2013.01); *B23K 35/3073* (2013.01); *B23K 35/3086* (2013.01); *B23K 35/362* (2013.01); *B23K 35/3608* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/10* (2013.01); *C22C 38/105* (2013.01); *C22C 38/12* (2013.01); *C22C 38/14* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01)

(58) Field of Classification Search
CPC ......... C22C 38/58; C22C 38/54; C22C 38/50; C22C 38/48; C22C 38/46; C22C 38/44; C22C 38/14; C22C 38/12; C22C 38/08; C22C 38/06; C22C 38/04; C22C 38/02; C22C 38/002; C22C 38/001
See application file for complete search history.

(56) References Cited

U.S. PATENT DOCUMENTS

| | | | |
|---|---|---|---|
| 7,393,597 | B2 | 7/2008 | Ogawa et al. |
| 7,562,807 | B2 | 7/2009 | Coleman et al. |

(Continued)

FOREIGN PATENT DOCUMENTS

| | | |
|---|---|---|
| CN | 1234314 | 11/1999 |
| CN | 1950173 | 4/2007 |

(Continued)

OTHER PUBLICATIONS

English Abstract and English Machine Translation of Kousu et al. (JP 2009-195980) (Sep. 3, 2009).*

(Continued)

*Primary Examiner* — Jessee Roe
(74) *Attorney, Agent, or Firm* — Cantor Colburn LLP (57) ABSTRACT

Provided are a welded joint of extremely low-temperature steel and flux cored, submerged, and gas metal arc welding materials which can be used to prepare the welded joint, wherein the welded joint of extremely low-temperature steel has outstanding impact toughness in extremely low-temperature conditions and excellent yield strength at room temperature.

9 Claims, 1 Drawing Sheet (51) Int. Cl.
*C22C 38/42* (2006.01)
*C22C 38/44* (2006.01)
*C22C 38/46* (2006.01)
*C22C 38/48* (2006.01)
*B23K 9/173* (2006.01)
*B23K 9/18* (2006.01)
*B23K 35/362* (2006.01)
*C22C 38/02* (2006.01)
*C22C 38/06* (2006.01)
*C22C 38/54* (2006.01)

(56) References Cited

U.S. PATENT DOCUMENTS

2005/0247763 A1* 11/2005 Coleman ............ B23K 35/3033
228/262.41
2009/0120357 A1 5/2009 Ikushima
2010/0136361 A1 6/2010 Osuki et al.

FOREIGN PATENT DOCUMENTS

| CN | 101925436 | 12/2010 |
|----|-----------|---------|
| JP | 06198488 | 7/1994 |
| JP | 07116891 | 5/1995 |
| JP | 2003136280 | 5/2003 |
| JP | 2006198488 | 8/2006 |
| JP | 3856663 | 12/2006 |
| JP | 4265604 | 5/2009 |
| JP | 2009195980 | 9/2009 |
| JP | 5218200 | 6/2013 |
| KR | 1020030050385 | 6/2003 |
| KR | 100411477 | 12/2003 |
| KR | 1020070079579 | 8/2007 |
| KR | 1020090016854 | 2/2009 |
| KR | 100925608 | 11/2009 |
| KR | 20110072880 | 6/2011 |
| KR | 1020130003685 | 1/2013 |
| KR | 1020130003686 | 1/2013 |

OTHER PUBLICATIONS

ASM International, Materials Park, Ohio, Properties and Selection: Irons, Steels, and High-Performance Alloys, vol. 1, "Classification and Designation of Carbon and Low-Alloy Steels", pp. 140-159, Mar. 1990.*

International Search Report—PCT/KR2013/010696 dated Apr. 15, 2014.

* cited by examiner

WELDED JOINT OF EXTREMELY LOW-TEMPERATURE STEEL, AND WELDING MATERIALS FOR PREPARING SAME

TECHNICAL FIELD

The present disclosure relates to a welded joint of extremely low temperature steel and a welding material for forming the welded joint. More particularly, the present disclosure relates to flux cored, submerged, and gas metal arc welding materials and welded joints formed of the materials.

BACKGROUND ART

Recently, demand for liquefied natural gas (LNG) has markedly increased, and thus, there is increasing demand for transportation equipment and storage tanks for transporting and storing extremely low temperature LNG. Tanks for transporting and storing LNG should have sufficient impact resistance at LNG temperatures equal to or lower than −162° C. Typical materials having a high degree of impact resistance at extremely low temperatures are aluminum (Al), 9% nickel (Ni) steel, and stainless steel (hereinafter referred to as "STS").

However, aluminum (Al) has a low degree of tensile strength, and thus relatively thick aluminum plates have to be used. In addition, aluminum (Al) has poor weldability. 9% Ni steel requires relatively expensive welding materials such as Inconel 625 (nickel: 50 wt % or more, Cr: 20 wt % or more), and the yield strength of welded joint of 9% Ni steel is low. STS is relatively expensive and has a low degree of thermal strain, and the quality of STS is not guaranteed at extremely low temperatures.

Therefore, it is necessary to develop a technique for forming high manganese (Mn) welded joints for use in extremely low temperature environments by using a material guaranteeing weldability and which is relatively inexpensive, as compared to nickel (Ni) used as an austenite stabilizing element.

Particularly, a welded joint having a degree of impact toughness of 27 J or greater is necessary for maintaining the stability of a structure at an extremely low temperature of −196° C. or lower, and a welded joint having a room temperature yield strength of 360 MPa or greater is necessary for manufacturing a structure at room temperature. To this end, in the related art, materials containing large amounts of relatively expensive nickel (Ni) and chromium (Cr) (Ni: 50 wt % or more, and Cr: 20 wt % or more) are used to form welded joints. Therefore, there is a need for a welding material containing low amounts of relatively expensive elements and a welded joint formed of the welding material.

DISCLOSURE

Technical Problem

An aspect of the present disclosure may provide a welded joint having a high degree of low temperature impact toughness and a high degree of yield strength, the welded joint maintaining an austenite phase having a high degree of toughness even at extremely low temperatures and not exhibiting high temperature cracking during a welding process.

An aspect of the present disclosure may also provide a welding material for forming the welded joint.

However, aspects of the present disclosure are not limited thereto. Additional aspects will be set forth in part in the description which follows, and will be apparent from the description to those of ordinary skill in the related art.

Technical Solution

According to an aspect of the present disclosure, a welded joint of extremely low temperature steel may include, by wt %, carbon (C): 0.05% to 1.30%, silicon (Si): 0.2% to 1.8%, manganese (Mn): 0.4% to 23%, chromium (Cr): 0.01% to 12%, nickel (Ni): 23% to 49%, at least one selected from molybdenum (Mo), cobalt (Co), and tungsten (W): 0.01% to 10%, aluminum (Al): 0.2% or less, titanium (Ti): 0.9% or less, at least one selected from niobium (Nb) and vanadium (V): 0.9% or less, at least one selected from sulfur (S) and phosphorus (P): 0.035% or less, and the balance of iron (Fe) and inevitable impurities.

According to another aspect of the present disclosure, a flux cored arc welding material may include a core and an outer sheath surrounding the core, wherein the flux cored arc welding material may include, by wt %, carbon (C): 0.05% to 1.30%, silicon (Si): 0.2% to 1.8%, manganese (Mn): 0.5% to 25%, at least one selected from phosphorus (P) and sulfur (S): less than 0.031%, nickel (Ni): 25% to 50%, aluminum (Al): 1.5% or less, TiO$_2$: 3.5% to 15%, at least one selected from potassium (K), sodium (Na), and lithium (Li): 0.01% to 1.3%, titanium (Ti): 2.4% or less, at least one selected from molybdenum (Mo), tungsten (W), and cobalt (Co): 0.001% to 10%, and the balance of iron (Fe) and inevitable impurities, wherein the outer sheath may include, by wt %, nickel (Ni): 35% to 46%, other impurities: 0.05% or less, and the balance of iron (Fe).

According to another aspect of the present disclosure, a submerged and gas metal arc welding material may include a core and an outer sheath surrounding the core, wherein the submerged and gas metal arc welding material may include, by wt %, carbon (C): 0.05% to 1.20%, silicon (Si): 0.3% to 1.2%, manganese (Mn): 3% to 25%, at least one selected from phosphorus (P) and sulfur (S): 0.03% or less, nickel (Ni): 25% to 50%, aluminum (Al): 1.5% or less, and the balance of iron (Fe) and inevitable impurities, wherein the outer sheath may include, by wt %, nickel (Ni): 35% to 46%, other impurities: 0.05% or less, and the balance of iron (Fe).

Advantageous Effects

The present disclosure provides a welded joint having a high degree of impact toughness at extremely low temperatures and a high degree of yield strength at room temperature. In addition, the present disclosure provides a welding material for forming the welded joint by a flux cored arc welding (FCAW) method, a submerged arc welding (SAW) method, or a gas metal arc welding (GMAW) method. The welding material contains low amounts of relatively expensive alloying elements and thus may be economically used.

BEST MODE

Generally, extremely low temperature high manganese (Mn) steel having a high Mn content is used as a substitute for 9% nickel (Ni) steel and stainless steel STS 304 used for the manufacturing of liquefied natural gas (LNG) storage tanks. It is known that extremely low temperature high Mn steel has a stable austenite structure even at extremely low temperatures and thus does not require additional processes such as a heat treatment process, and does not exhibit toughness deterioration in a heat-affected zone (HAZ) during welding.

A welded joint of extremely low temperature steel of the present disclosure may be formed by welding extremely low temperature high Mn steel (which is used in extremely low temperature applications such as marine structures, energy facilities, shipbuilding facilities, and pressure containers) by a submerged arc welding (SAW) method, a flux cored arc welding (FCAW) method, or a gas metal arc welding (GMAW) method. The welded joint of the present disclosure is designed to have a high degree of low temperature impact toughness. That is, the present disclosure provides a welded joint formed by a SAW method, a FCAW method, or a GMAW method and having a high degree of low temperature impact toughness and a high degree of room temperature yield strength. For this, components of the welded joint are adjusted so that the welded joint may maintain an austenite phase having a high degree of toughness even in extremely low temperature environments and may not be cracked at high temperatures during welding.

In addition, the present disclosure provides flux cored, submerged, and gas metal arc welding materials. The welding materials may be used to weld extremely low temperature high Mn steel to a different material and may have a high degree of low temperature impact toughness. That is, components of the welding materials are adjusted so that the welding materials may maintain an austenite phase having a high degree of toughness in extremely low temperature environments and may not crack at high temperatures during a welding process. That is, the welding materials have a high degree of low temperature impact toughness and allow all position welding.

First, the Welded Joint of Extremely Low Temperature Steel of the Present Disclosure Will be Described in Detail.

According to an exemplary embodiment of the present disclosure, the welded joint includes, by wt %, carbon (C): 0.05% to 1.30%, silicon (Si): 0.2% to 1.8%, manganese (Mn): 0.4% to 23%, chromium (Cr): 0.01% to 12%, nickel (Ni): 23% to 49%, at least one selected from molybdenum (Mo), cobalt (Co), and tungsten (W): 0.01% to 10%, aluminum (Al): 0.2% or less, titanium (Ti): 0.9% or less, at least one selected from niobium (Nb) and vanadium (V): 0.9% or less, at least one selected from sulfur (S) and phosphorus (P): 0.035% or less, and the balance of iron (Fe) and inevitable impurities.

The numerical ranges of the contents of the components are set due to the reasons provided below. In the following description, the content of each component is given in wt % unless otherwise specified.

Carbon (C): 0.05% to 1.30%

Carbon (C) is known as a potent element stabilizing austenite, thereby guaranteeing the strength of a metal welding workpiece and the impact toughness of the metal welding workpiece at extremely low temperatures. In addition, carbon (C) is an interstitial element increasing the yield strength of a metal. If the content of carbon (C) is less than 0.05%, the strength of the welded joint is decreased. In this case, the content of a substitute alloying element may be increased. On the contrary, if the content of carbon (C) is greater than 1.30%, carbon (C) combines with alloying elements manganese (Mn) or chromium (Cr) to form carbides such as MC or $M_{23}C_6$, thereby decreasing the low temperature impact toughness of the welded joint and causing the formation of cracks in the welded joint.

Silicon (Si): 0.2% to 1.8%

If the content of silicon (Si) is less than 0.2%, a metal welding workpiece may not be sufficiently deoxidized, and the fluidity of the metal welding workpiece may be decreased when the metal welding workpiece is melted. On the contrary, if the content of silicon (Si) is greater than 1.8%, segregation may occur in the metal welding workpiece, causing cracks in the welded joint.

Manganese (Mn): 0.4% to 23%

Manganese (Mn) is a main element inducing the formation of austenite which is a stable phase at low temperature. manganese (Mn) is relatively inexpensive, as compared to nickel (Ni). If the content of manganese (Mn) is less than 0.4%, austenite is not sufficiently formed, thereby markedly lowering the toughness of the welded joint at extremely low temperatures. In contrast, if the content of manganese (Mn) is greater than 23%, problems such as excessive segregation, cracking at high temperatures, and the generation of harmful fumes may occur.

Chromium (Cr): 0.01% to 12%

Chromium (Cr) is a ferrite stabilizing element. In addition, if a certain amount of chromium (Cr) is added, the content of an austenite stabilizing element may be reduced. Furthermore, chromium (Cr) functions as an element improving corrosion resistance and strength. Although chromium (Cr) is added in a small amount of 0.01 wt % or more, the effect of increasing strength and corrosion resistance is obtained. However, if the content of chromium (Cr) is greater than 12%, Cr-based carbides are excessively formed, causing a decrease in the extremely low temperature toughness of the welded joint.

Nickel (Ni): 23% to 49%

Although nickel (Ni) is necessary as an austenite stabilizing element, since nickel (Ni) is highly expensive, it may be preferable that the content of nickel (Ni) be within the range of 23% to 49%. Although nickel (Ni) increases the extremely low temperature impact toughness of the welded joint, nickel (Ni) decreases the room temperature yield strength of the welded joint. Therefore, the content of nickel (Ni) is properly adjusted to be within the range of 23% to 49%.

At Least One Selected from Molybdenum (Mo), Cobalt (Co), and Tungsten (W): 0.01% to 10%

Even when molybdenum (Mo), cobalt (Co), and tungsten (W) are added in a small amount of 0.01% or more, the yield strength and tensile strength of a base metal are improved. However, if the total content of one or more of molybdenum (Mo), cobalt (Co), and tungsten (W) is greater than 10%, the formation of carbides thereof is facilitated, thereby decreasing the extremely low temperature toughness of the welded joint.

Aluminum (Al): 0.2% or Less

Aluminum (Al) reduces strength and increases stacking fault energy (SFE), thereby guaranteeing low temperature toughness of the welded joint. However, if the content of aluminum (Al) is greater than 0.2%, oxides are excessively formed, and thus the extremely low temperature impact toughness of the welded joint is lowered.

Titanium (Ti): 0.9% or Less

Titanium (Ti) increases the yield strength and tensile strength of the welded joint. However, if the content of titanium (Ti) is greater than 0.9%, cracks may be formed in the welded joint.

At Least One Selected from Niobium (Nb) and Vanadium (V): 0.9% or Less

Niobium (Nb) and vanadium (V) are elements increasing the room temperature strength of the welded joint. However, if the total content of one or more of niobium (Nb) and vanadium (V) is greater than 0.9%, cracks may be formed in the welded joint. Therefore, the content thereof may be preferably 0.9 wt % or less.

At Least One Selected from Sulfur (S) and Phosphorus (P): 0.035% or Less

Sulfur (S) and phosphorus (P) are typical elements causing high temperature cracking. Therefore, it is necessary to adjust the contents of sulfur (S) and phosphorus (P) to be low. Although sulfur (S) and phosphorus (P) are inevitably included, it is necessary to control the total content of sulfur (S) and phosphorus (P) to be 0.035% or less.

In addition to the above-described essential components, the welded joint of the present disclosure may further include at least one selected from nitrogen (N): 0.001 wt % to 0.6 wt % and boron (B): 0.0001 wt % to 0.008 wt %.

Nitrogen (N): 0.001% to 0.6%

Nitrogen (N) increases the strength of the welded joint and has the same characteristics as those of carbon (C). If the content of nitrogen (N) is greater than 0.6%, voids may be formed in the welded joint. Therefore, it is necessary to maintain the content of nitrogen (N) at 0.6% or less. Moreover, if the content of nitrogen (N) in the welded joint is 0.75% or more, nitrides are excessively formed, and thus the impact toughness of the welded joint is lowered.

Boron (B): 0.0001% to 0.008%

Boron (B) is an interstitial strength enhancing element, and even though boron (B) is added to the welded joint in small amounts, the yield strength and tensile strength of the welded joint may be increased. However, if boron (B) is added in large amounts, the welded joint may crack. Therefore, the content of boron (B) is adjusted to be 0.008% or less.

In the present disclosure, the other component of the welded joint is iron (Fe). However, impurities in raw materials or manufacturing environments may be inevitably included in the welded joint, and such impurities may not be removed. Such impurities are well-known to those of ordinary skill in manufacturing industries, and thus descriptions thereof will not be given in the present disclosure.

The welded joint of the present disclosure includes the above-described components, and at least one selected from molybdenum (Mo), cobalt (Co), and tungsten (W) (hereinafter also referred to as "Mo+W+Co"), at least one selected from niobium (Nb) and vanadium (V) (hereinafter also referred as "Nb+V"), and nickel (Ni), chromium (Cr), aluminum (Al), and titanium (Ti) included in the welded joint may satisfy the following formulas.

$$1.5Ni - 8Cr - 2.5(Mo+W+Co) - 20Al - 29Ti - 55(Nb+V) \geq 0 \quad \text{(Formula 1)}$$

If Formula 1 is satisfied, the impact toughness of the welded joint may be 27 J or greater at an extremely low temperature of −196° C.

Furthermore, in the welded joint of the present disclosure including the above-described components, C, Mn, Cr, Ni, Mo+Co+W, Ti, and Nb+V may satisfy Formula 2 below.

$$98.5C - 1.08Mn + 9.73Cr - 1.52Ni + 10.3(Mo+W+Co) + 122Ti + 34.7(Nb+V) \geq 0 \quad \text{(Formula 2)}$$

If Formula 2 is satisfied, the yield strength of the welded joint may be 360 MPa or greater at room temperature.

Furthermore, in the welded joint of the present disclosure including the above-described components, Si, Al, and Ti may satisfy Formula 3 below.

$$Si + Al + Ti \leq 2.0 \quad \text{(Formula 3)}$$

If Si+Al+Ti>2.0, cracks may be formed in the welded joint. Therefore, the welded joint is controlled to satisfy Formula 3.

In other words, according to technical effects of the present disclosure, the welded joint has an impact toughness of 27 J or greater at an extremely low temperature of −196° C. and a yield strength of 360 MPa at room temperature.

Next, a Flux Cored Arc Welding Material of the Present Disclosure for Forming a Welded Joint Will be Described in Detail.

The flux cored arc welding material of the present disclosure is a composite welding wire having a dual structure formed by a core and an outer sheath. The core includes an alloy and flux powder, and the outer sheath covers the outer surface of the core.

In detail, the outer sheath covering the core has a single structure formed of an iron (Fe)-based strip containing nickel (Ni) in an amount of 35 wt % to 46 wt %.

The flux cored arc welding material for FCAW of the present disclosure includes, by wt %, carbon (C): 0.05% to 1.30%, silicon (Si): 0.2% to 1.8%, manganese (Mn): 0.5% to 25%, at least one selected from phosphorus (P) and sulfur (S): less than 0.031%, nickel (Ni): 25% to 50%, aluminum (Al): 1.5% or less, $TiO_2$: 3.5% to 15%, at least one selected from potassium (K), sodium (Na), and lithium (Li): 0.01% to 1.3%, titanium (Ti): 2.4% or less, at least one selected from molybdenum (Mo), tungsten (W), and cobalt (Co): 0.001% to 10%, and the balance of iron (Fe) and inevitable impurities.

The numerical ranges of the contents of the components are set due to the reasons provided below.

Carbon (C): 0.05 wt % to 1.30 wt %

Carbon (C) is known as a potent element stabilizing austenite, thereby guaranteeing the strength of a metal welding workpiece and the impact toughness of the metal welding workpiece at extremely low temperatures. Thus, carbon (C) is an essential element of the welding material of the present disclosure. However, since the welding wire receives a sufficient amount of carbon (C) from flux even though the welding wire has a low carbon content, it is sufficient that the lower limit of the carbon content is 0.05 wt %. However, if the content of carbon (C) is less than 0.05% wt %, austenite is not formed at extremely low temperatures, thereby causing a decrease in toughness. In contrast, if the content of carbon (C) is greater than 1.30 wt %, carbon dioxide gas may be generated to cause defects in a welded joint during welding, and carbon (C) may combine with alloying elements such as manganese (Mn) and chromium (Cr) to form carbides such as MC and $M_{23}C_6$ that lower the impact toughness of the welded joint. Therefore, it may be preferable that the content of carbon (C) be within the range of 0.05 wt % to 1.30 wt %.

Silicon (Si): 0.2 wt % to 1.8 wt %

If the content of silicon (Si) is less than 0.2 wt %, a metal welding workpiece may not be sufficiently deoxidized, and the fluidity of the metal welding workpiece may be lowered when the metal welding workpiece is melted. In contrast, if the content of silicon (Si) is greater than 1.8 wt %, segregation may occur in the metal welding workpiece, causing a decrease in low temperature impact toughness and worsening welding crack susceptibility. Therefore, it may be preferable that the content of silicon (Si) be within the range of 0.3 wt % to 1.8 wt %.

Manganese (Mn): 0.5 wt % to 25 wt %

Manganese (Mn) is a main element inducing the formation of austenite which is a stable phase at low temperature. Thus, manganese (Mn) is an essential element in the welding material of the present disclosure. Manganese (Mn) is relatively inexpensive, as compared to nickel (Ni). If the content of manganese (Mn) is less than 0.5%, austenite is not sufficiently formed, thereby markedly lowering the toughness of a welded joint at extremely low temperatures. In contrast, if the content of manganese (Mn) is greater than 23%, problems such as excessive segregation, cracking at high temperatures, and the generation of harmful fumes may occur. Therefore, it may be preferable that the content of manganese (Mn) be within the range of 0.5 wt % to 25 wt %.

At Least One Selected from Sulfur (P) and Phosphorus (S): 0.031 wt % or Less

Sulfur (P) and phosphorus (S) segregate in a finally solidified portion after welding. Sulfur (P) and phosphorus (S) form a compound having a low melting point, and due to welding stress, cracks may be formed in a portion where the compound is formed. Therefore, it may be preferable that the total content of sulfur (P) and phosphorus (S) be 0.031 wt % or less.

Nickel (Ni): 25 wt % to 50 wt %

In the present disclosure, nickel (Ni) is an essential element stabilizing austenite. Preferably, the content of nickel (Ni) is adjusted to be 25 wt % or more for guaranteeing extremely low temperature toughness, but is adjusted to be 50 wt % or less in consideration of manufacturing costs. That is, it may be preferable that the content of nickel (Ni) be within the range of 25 wt % to 50 wt %.

Aluminum (Al): 1.5 wt % or Less

Aluminum (Al) reduces strength and increases stacking fault energy (SFE), thereby guaranteeing the low temperature toughness of the welding material. However, if the content of aluminum (Al) is greater than 1.5 wt %, $TiO_2$ formed in a welded joint may be reduced to form Ti(C,N), and thus the extremely low temperature impact toughness of the welded joint may be greatly reduced. Therefore, it may be preferable that the content of aluminum (Al) be 1.5 wt % or less.

$TiO_2$ (Titanium Dioxide): 3.5 wt % to 15 wt %

$TiO_2$ is a slag forming agent that solidifies before a melted metal welding workpiece solidifies and thus prevents the melted metal welding workpiece from flowing downward, thereby enabling all position welding. For obtaining this effect in the present disclosure, preferably, $TiO_2$ is added in an amount of 3.5 wt % or more. However, if the content of $TiO_2$ is greater than 15 wt %, the content of oxides in a metal welding workpiece is steeply increased, and thus the extremely low temperature impact toughness of the metal welding workpiece is decreased. Therefore, it may be preferable that the content of $TiO_2$ be within the range of 3.5 wt % to 15 wt %.

At Least One Selected from Potassium (K), Sodium (Na), and Lithium (Li): 0.01 wt % to 1.3 wt %

During welding, these alkali metals may facilitate the creation of arcs by lowering the ionization potential of arcs and may function to stably maintain arcs. These effects may be obtained when the alkali metals are added in amounts of 0.01 wt % or more. However, if the total content of the alkali metals is greater than 1.3 wt %, fumes may be excessively generated due to a high vapor pressure. In the present disclosure, at least one selected from potassium (K), sodium (Na), and lithium (Li) is added, and the effect of the alkali metals has no relationship with the content ratio of the alkali metals.

Titanium (Ti): 2.4 wt % or Less

Preferably, the welding wire of the present disclosure may have a titanium (Ti) content of 2.4 wt % or less. Titanium (Ti) is a powerful deoxidizer capable of removing oxides from a metal welding workpiece. However, if titanium (Ti) is added in excessive amounts, the content of Ti(C,N) may increase, and thus the extremely low temperature impact toughness of the welding material may be extremely decreased. Therefore, it may be preferable that the content of aluminum (Al) be 2.4 wt % or less.

At Least One Selected from Molybdenum (Mo), Tungsten (W), and Cobalt (Co): 0.001 wt % to 10 wt %

Molybdenum (Mo), tungsten (W), and cobalt (Co) are elements increasing the strength of a base metal. In the present disclosure, preferably, the total content of Mo, W, and Co is 0.001 wt % or more. However, if the total content of Mo, W, and Co is greater than 10%, carbides are excessively formed, decreasing the extremely low temperature toughness of the welding material. Therefore, it may be preferable that the total content of one or more of Mo, W, and Co be within the range of 0.001 wt % to 10 wt %.

In addition to the above-described essential components, the welding material of the present disclosure may further include, by wt %, one or more of chromium (Cr): 0.001% to 10%, at least one selected from niobium (Nb) and vanadium (V): 0.001% to 1.2%, at least one selected from $SiO_2$, $ZrO_2$, and $Al_2O_3$: 0.01% to 7.0%, at least one selected from fluorine (F) and calcium (Ca): 0.01% to 1.0%, and nitrogen (N): 0.01% to 0.5%. In this case, the welding material of the present disclosure may provide improved effects.

Chromium (Cr): 0.001 wt % to 10 wt %

Chromium (Cr) is an element stabilizing ferrite and improving strength and corrosion characteristics. To guarantee these effects, it may be preferable that that content of chromium (Cr) be 0.001 wt %. However, if the content of chromium (Cr) is greater than 10 wt %, chromium-based carbides are excessively formed, decreasing the extremely low temperature toughness of the welding material. Therefore, it may be preferable that the content of chromium (Cr) be within the range of 0.001 wt % to 10 wt %.

At Least One Selected from Niobium (Nb) and Vanadium (V): 0.001 wt % to 1.2 wt %

Niobium (Nb) and vanadium (V) are elements increasing the strength of a base metal. In the present disclosure, preferably, the total content of niobium (Nb) and vanadium (V) is 0.001 wt % or more. However, if the total content of niobium (Nb) and vanadium (V) is greater than 1.2%, carbides are excessively formed, thereby decreasing the extremely low temperature toughness of the welding material. Therefore, it may be preferable that the total content of one or more of niobium (Nb) and vanadium (V) be within the range of 0.001 wt % to 1.2 wt %.

At Least One Selected from SiO$_2$ (Silicon Dioxide), ZrO$_2$ (Zirconium Dioxide), and Al$_2$O$_3$ (Aluminum Oxide): 0.01 Wt % to 7.0 wt %

If the total content of one or more of SiO$_2$, ZrO$_2$, and Al$_2$O$_3$ is less than 0.01 wt %, slag coating, striping of slag, and arc stability are negatively affected, and thus it may be difficult to perform an all position welding process and properly form welding beads. In contrast, if the total content of one or more of SiO$_2$, ZrO$_2$, and Al$_2$O$_3$ is greater than 7.0 wt %, the amount of melted slag may be rapidly increased, and the viscosity of the slag may also be increased, thereby negatively affecting an all position welding process and the formation of welding beads. In addition, the transfer of components such as silicon (Si) and aluminum (Al) to a deposited metal is increased, thereby decreasing impact toughness. Therefore, it may be preferable that the total content of one or more of SiO$_2$, ZrO$_2$, and Al$_2$O$_3$ be within the range of 0.01 wt % to 7.0 wt %.

At Least One Selected from Fluorine (F) and Calcium (Ca): 0.01 wt % to 1.0 wt %

Among alkali metal based and alkaline earth metal based fluorine compounds, fluorine (F) and calcium (Ca) may be additionally added to the welding wire of the present disclosure to improve the properties of the welding wire. If a fluorine compound is added to the welding wire in an amount of 0.01 wt % or more, fluorine (F) is present in a high-temperature arc and reacts with hydrogen (dehydrogenation reaction), thereby effectively reducing diffusion hydrogen. However, if the content of the fluorine compound is greater than 1.0 wt %, fumes are excessively generated because of a high vapor pressure, and the viscosity of slag in a molten pool is excessively decreased to result in unstable welding beads when rutile type slag containing TiO$_2$ as a main component is used during welding. Therefore, it may be preferable that the total content of fluorine (F) and calcium (Ca) be within the range of 0.01 wt % to 1.0 wt %.

Nitrogen (N): 0.01 wt % to 0.5 wt %

In addition, if nitrogen (N) is additionally added to the welding wire of the present disclosure, the properties of the welding wire may be improved. Nitrogen (N) results in the same effects as carbon (C). In the present disclosure, preferably, the content of nitrogen (N) may be adjusted to be 0.01 wt % or more. However, if the content of nitrogen (N) is greater than 0.5 wt %, nitrides may be excessively formed to result in a decrease in impact toughness. Therefore, it may be preferable that the content of nitrogen (N) be within the range of 0.01 wt % to 0.5 wt %.

In the present disclosure, the other component of the welding material is iron (Fe). However, impurities in raw materials or manufacturing environments may be inevitably included in the welding material, and such impurities may not be removed. Such impurities are well-known to those of ordinary skill in manufacturing industries, and thus descriptions thereof will not be given in the present disclosure.

The outer sheath of the welding material includes, by wt %, Ni: 35% to 46%, other impurities: 0.05% or less, and the balance of iron (Fe). That is, the outer sheath is formed of high nickel (Ni) steel to increase the content of nickel (Ni) in a welded joint during a welding process. The contents of nickel (Ni) and other impurities in the outer sheath are adjusted to be within the above-mentioned ranges to guarantee toughness at extremely low temperatures and decrease defects such as cracks during welding.

The welding material may have a diameter of about 0.9 mm to about 1.6 mm, and when the density of the outer sheath and the density of the core, the weight fraction of the outer sheath in the welding material may preferably be within the range of 50% to 90%.

Figure 1:
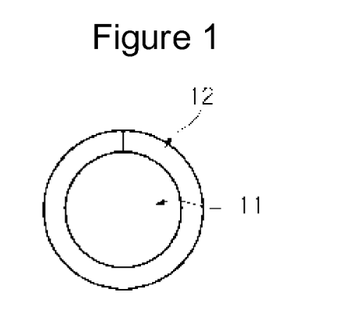
FIG. 1 is a cross-sectional view illustrating a welding material according to an exemplary embodiment of the present disclosure.

As shown in FIG. 1, the outer sheath may have a single layer structure surrounding the core containing an alloy.

Next, a Submerged and Gas Metal Arc Welding Material of the Present Disclosure for Forming a Welded Joint Will be Described in Detail.

The submerged and gas metal arc welding material of the present disclosure includes, by wt %, carbon (C): 0.05% to 1.20%, silicon (Si): 0.3% to 1.2%, manganese (Mn): 3% to 15%, at least one selected from phosphorus (P) and sulfur (S): 0.03% or less, nickel (Ni): 25% to 50%, aluminum (Al): 1.5% or less, and the balance of iron (Fe) and inevitable impurities.

The numerical ranges of the contents of the components are set due to the reasons provided below.

Carbon (C): 0.05 wt % to 1.20 wt %

Carbon (C) is known as a potent element stabilizing austenite, thereby guaranteeing the strength of a metal welding workpiece and the impact toughness of the metal workpiece at extremely low temperatures. Thus, carbon (C) is an essential element of the welding material of the present disclosure. However, since a welding wire (the welding material) receives a sufficient amount of carbon (C) from flux even though the welding wire has a low carbon content, it is sufficient that the lower limit of the carbon content is 0.05 wt % or less. However, if the content of carbon (C) is less than 0.05 wt %, austenite is not formed at extremely low temperatures, thereby causing a decrease in toughness. In contrast, if the content of carbon (C) is greater than 1.20 wt %, carbon dioxide gas may be generated to cause defects in a welded joint during welding, and carbon (C) may combine with alloying elements such as manganese (Mn) and chromium (Cr) to form carbides such as MC and M$_{23}$C$_6$ that lower the impact toughness of the welded joint. Therefore, it may be preferable that the content of carbon (C) be within the range of 0.05 wt % to 1.20 wt %.

Silicon (Si): 0.30 wt % to 1.2 wt %

If the content of silicon (Si) is less than 0.30 wt %, a metal welding workpiece may not be sufficiently deoxidized, and the fluidity of the metal welding workpiece may be lowered when the metal welding workpiece is melted. In contrast, if the content of silicon (Si) is greater than 1.2 wt %, segregation may occur in the metal welding workpiece, causing a decrease in low temperature impact toughness and worsening welding crack susceptibility. Therefore, it may be preferable that the content of silicon (Si) be within the range of 0.30 wt % to 1.2 wt %.

Manganese (Mn): 3 wt % to 15 wt %

Manganese (Mn) is a main element inducing the formation of austenite which is a stable phase at low temperature. Thus, manganese (Mn) is an essential element in the welding material of the present disclosure. Manganese (Mn) is relatively inexpensive, as compared to nickel (Ni). If the content of manganese (Mn) is less than 3%, austenite is not sufficiently formed, thereby markedly lowering toughness at extremely low temperatures. However, if the content of manganese (Mn) is greater than 15 wt %, segregation may occur excessively, and thus high temperature cracking may occur. Therefore, it may be preferable that the content of manganese (Mn) be within the range of 3 wt % to 15 wt %.

At Least One Selected from Sulfur (P) and Phosphorus (S): 0.03% or Less

Sulfur (P) and phosphorus (S) segregate in a finally solidified portion after welding. Sulfur (P) and phosphorus (S) form a compound having a low melting point, and due to welding stress, cracks may be formed in a portion in which the compound is formed. Therefore, it may be preferable that the total content of sulfur (P) and phosphorus (S) be 0.03 wt % or less.

Nickel (Ni): 25 wt % to 50 wt %

In the present disclosure, nickel (Ni) is an essential element stabilizing austenite. Preferably, the content of nickel (Ni) is adjusted to be 25 wt % or more for guaranteeing extremely low temperature toughness, but is adjusted to be 50 wt % or less in consideration of manufacturing costs. That is, it may be preferable that the content of nickel (Ni) be within the range of 25 wt % to 50 wt %.

Aluminum (Al): 1.5 wt % or Less

Aluminum (Al) reduces strength and increases stacking fault energy (SFE), thereby guaranteeing the low temperature toughness of the welding material. However, if the content of aluminum (Al) is greater than 1.5 wt %, when a welding process is performed using flux including $TiO_2$, $TiO_2$ formed in a welded joint may be reduced to form Ti(C,N). In this case, the extremely low temperature impact toughness of the welded joint may be greatly reduced. Therefore, it may be preferable that the content of aluminum (Al) be 1.5 wt % or less.

In addition to the above-described essential components, the welding material of the present disclosure may further include, by wt %, one or more selected from the group consisting of chromium (Cr): 0.001% to 6%, at least one selected from molybdenum (Mo), tungsten (W), and cobalt (Co): 0.001% to 6%, at least one selected from niobium (Nb) and vanadium (V): 0.001% to 1.5%, and nitrogen (N): 0.01% to 0.5%. In this case, the welding material of the present disclosure may provide improved effects.

Chromium (Cr): 0.001 wt % to 6 wt %

Chromium (Cr) is an element stabilizing ferrite and improving strength and corrosion characteristics. To guarantee these effects, it may be preferable that that content of chromium (Cr) be 0.001 wt %. However, if the content of chromium (Cr) is greater than 6%, chromium-based carbides are excessively formed, decreasing the extremely low temperature toughness of the welding material. Therefore, it may be preferable that the content of chromium (Cr) be within the range of 0.001 wt % to 6 wt %.

At Least One Selected from Molybdenum (Mo), Tungsten (W), and Cobalt (Co): 0.001 wt % to 6 wt %

Molybdenum (Mo), tungsten (W), and cobalt (Co) are elements increasing the strength of a base metal. In the present disclosure, preferably, the total content of Mo, W, and Co is 0.001% or more. However, if the total content of Mo, W, and Co is greater than 6%, carbides are excessively formed, thereby decreasing the extremely low temperature toughness of the welding material. Therefore, it may be preferable that the total content of one or more of Mo, W, and Co be within the range of 0.001 wt % to 6 wt %.

At Least One Selected from Niobium (Nb) and Vanadium (V): 0.001 wt % to 1.5 wt %

Niobium (Nb) and vanadium (V) are elements increasing the strength of a base metal. In the present disclosure, preferably, the total content of niobium (Nb) and vanadium (V) is 0.001 wt % or more. However, if the total content of niobium (Nb) and vanadium (V) is greater than 1.5%, carbides are excessively formed, thereby decreasing the extremely low temperature toughness of the welding material. Therefore, it may be preferable that the total content of one or more of niobium (Nb) and vanadium (V) be within the range of 0.001 wt % to 1.5 wt %.

Nitrogen (N): 0.01 wt % to 0.5 wt %

In addition, if nitrogen (N) is additionally added to the welding wire (welding material) of the present disclosure, the properties of the welding wire may be improved. Nitrogen (N) results in the same effects as carbon (C). In the present disclosure, preferably, the content of nitrogen (N) may be adjusted to be 0.01 wt % or more. However, if the content of nitrogen (N) is greater than 0.5 wt %, nitrides may be excessively formed to result in a decrease in impact toughness. Therefore, it may be preferable that the content of nitrogen (N) be within the range of 0.01 wt % to 0.5 wt %.

In the present disclosure, the other component of the welding material is iron (Fe). However, impurities in raw materials or manufacturing environments may be inevitably included in the welding material, and such impurities may not be removed. Such impurities are well-known to those of ordinary skill in manufacturing industries, and thus descriptions thereof will not be given in the present disclosure.

An outer sheath of the welding material includes, by wt %, Ni: 35% to 46%, other impurities: 0.05% or less, and the balance of iron (Fe). That is, the outer sheath is formed of high nickel (Ni) steel to increase the content of nickel (Ni) in a welded joint during a welding process. The contents of nickel (Ni) and other impurities in the outer sheath are adjusted to be within the above-mentioned ranges to guarantee toughness at extremely low temperatures and decrease defects such as cracks during welding.

The welding material may have a diameter of about 0.9 mm to about 6.0 mm, and when the density of the outer sheath and the density of a core of the welding material, the weight fraction of the outer sheath in the welding material may be preferably within the range of 50% to 90%.

As shown in FIG. 1, the outer sheath may have a single layer structure surrounding the core containing an alloy.

An additional outer sheath may be disposed between the core and the outer sheath (refer to FIG. 2) or around the outer sheath (refer to FIG. 3) to form a dual outer sheath structure. The additional outer sheath includes, by wt %, carbon (C): 0.025% or less, manganese (Mn): 0.025% or less, and the balance of iron (Fe) and inevitable impurities.

Figure 2:
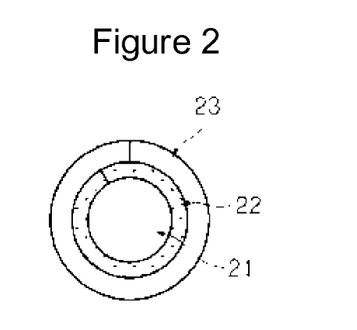
FIG. 2 is a cross-sectional view illustrating a welding material according to an exemplary embodiment of the present disclosure.
Figure 3:
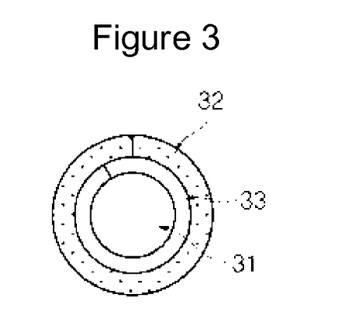
FIG. 3 is a cross-sectional view illustrating a welding material according to an exemplary embodiment of the present disclosure.

That is, the additional outer sheath is formed of low carbon steel to increase the depth of welding and enhance the strength of the welding wire (welding material) to make it easy to move the welding wire in a straight line during welding. If the content of carbon (C) or manganese (Mn) is outside the above-mentioned range, it may be difficult to perform a drawing process when the welding material is manufactured.

Although the additional outer sheath is added as described above, the composition of the entire welding material is not varied. That is, the welding material includes, by wt %, carbon (C): 0.05% to 1.20%, silicon (Si): 0.3% to 1.2%, manganese (Mn): 3% to 15%, at least one selected from phosphorus (P) and sulfur (S): 0.03% or less, nickel (Ni): 25% to 50%, aluminum (Al): 1.5% or less, and the balance of iron (Fe) and inevitable impurities. However, if necessary, the welding material may further include one or more selected from the group consisting of chromium (Cr): 0.001% to 6%, at least one selected from molybdenum (Mo), tungsten (W), and cobalt (Co): 0.001% to 6%, at least one selected from niobium (Nb) and vanadium (V): 0.001% to 1.5%, and nitrogen (N): 0.01% to 0.5%.

The welding material including the additional outer sheath may have a diameter of about 0.9 mm to about 6.0 mm, and the weight fraction of the entire outer sheath including the additional outer sheath may be preferably 50% to 90% of the total weight of the welding material when the density difference between the entire outer sheath and the core is considered. Since the core includes essential elements, the weight fraction of the core in the entire welding wire may be 10% to 50%. Therefore, although the welding material has a dual outer sheath structure, the weight fraction of the entire outer sheath is 50% to 90% of the total weight of the welding material as in the case in which the welding material has a single outer sheath structure.

Reference numerals used in the accompanying drawing are as follows.

11: CORE, 12: OUTER SHEATH (HAVING A HIGH NI CONTENT)
21: CORE, 22: ADDITIONAL OUTER SHEATH (FORMED OF LOW CARBON STEEL), 23: OUTER SHEATH (HAVING A HIGH NI CONTENT)
31: CORE, 32: ADDITIONAL OUTER SHEATH (FORMED OF LOW CARBON STEEL), 33: OUTER SHEATH (HAVING A HIGH NI CONTENT)

MODE FOR INVENTION

Hereinafter, the present disclosure will be described more specifically through examples. However, the examples are for illustrative purposes only and are not intended to limit the scope of the present invention.

Example 1

Welded joints having compositions shown in Tables 1 and 2 were formed by different welding methods. In Tables 1 and 2, the content of each component is given in wt %.

A submerged arc welding (SAW) method, a flux cored arc welding (FCAW) method, and a gas metal arc welding (GMAW) method (or a MCW method) were used.

In the SAW method, welding was performed using Flux AB (commercial flux) at a heat input rate of 2.4 KJ to 3.0 KJ/mm.

In the FCAW method, welding was performed at a heat input rate of 1.7 KJ/mm under conditions of 100% $CO_2$.

In the GMAW (or MCW) method, welding was performed at a heat input rate of 1.7 KJ/mm under conditions of 80% Ar+20% $CO_2$.

Thereafter, the presence of cracks or voids in the welded joints were observed, and the impact toughness of each welded joint at −196° C. and the yield strength of each welded joint at room temperature were measured. Results of the observation or measurement are shown in Tables 1 and 2. In Tables 1 and 2, impact toughness values ($CVN@-196°$ C.) are given in joules (J), and yield strength values are given in MPa. In addition, components written using the symbol "+" indicate that at least one selected from the components is included in the welded joints.

TABLE 1

| NO. | WM | C | Si | Mn | P + S | Cr | Ni | Mo + W + Co | Al | Ti | Nb + V |
|---|---|---|---|---|---|---|---|---|---|---|---|
| C S 1-1 | MCW | 0.02 | 0.74 | 0.55 | 0.014 | 0.012 | 23.8 | 0.024 | 0.009 | 0.007 | 0.021 |
| C S 1-2 | FCAW | 0.05 | 0.21 | 0.62 | 0.011 | 0.007 | 29.8 | 0.02 | 0.009 | 0.041 | 0.02 |
| C S 1-3 | FCAW | 0.03 | 1.1 | 0.53 | 0.009 | 0.02 | 33.8 | 0.02 | 0.01 | 0.038 | 0.023 |
| C S 1-4 | FCAW | 0.05 | 0.61 | 0.49 | 0.006 | 0.022 | 41.8 | 0.023 | 0.02 | 0.036 | 0.02 |
| C S 1-5 | MCW | 0.06 | 0.76 | 1.71 | 0.029 | 0.024 | 51.6 | 0.024 | 0.015 | 0.032 | 0.022 |
| C S 1-6 | MCW | 0.42 | 0.51 | 15.2 | 0.01 | 0.016 | 24.3 | 0.022 | 0.011 | 0.011 | 0.01 |
| C S 1-7 | FCAW | 0.01 | 0.59 | 4.41 | 0.01 | 0.01 | 32.8 | 0.011 | 0.015 | 0.029 | 0.93 |
| C S 1-8 | FCAW | 0.41 | 0.58 | 0.88 | 0.013 | 0.014 | 33.6 | 0.013 | 0.013 | 0.058 | 0.039 |
| C S 1-9 | FCAW | 0.66 | 1.86 | 7.91 | 0.017 | 0.014 | 26.2 | 0.022 | 0.12 | 0.057 | 0.017 |
| C S 1-10 | FCAW | 0.48 | 0.54 | 12.4 | 0.038 | 0.042 | 34.9 | 1.33 | 0.015 | 0.083 | 0.021 |
| C S 1-11 | MCW | 0.81 | 0.31 | 4.05 | 0.01 | 0.015 | 28.5 | 10.6 | 0.022 | 0.01 | 1.76 |
| C S 1-12 | FCAW | 0.92 | 0.69 | 6.27 | 0.015 | 12.4 | 31.2 | 1.77 | 0.1 | 0.266 | 0.03 |
| C S 1-13 | FCAW | 0.73 | 0.51 | 8.54 | 0.02 | 4.55 | 32.5 | 12.49 | 0.11 | 0.161 | 0.023 |
| C S 1-14 | FCAW | 0.89 | 0.92 | 33.1 | 0.014 | 0.012 | 39.6 | 2.04 | 0.797 | 1.215 | 0.063 |
| C S 1-15 | FCAW | 1.32 | 0.39 | 8.2 | 0.013 | 0.016 | 42.5 | 1.31 | 1.23 | 0.74 | 0.13 |

| NO. | B | N | F1 | F2 | F3 | Cracks Voids | $CVN_{@-196° C.}$ | YS |
|---|---|---|---|---|---|---|---|---|
| C S 1-1 | 0.0005 | 0.0097 | 34.006 | −32.8533 | 0.756 | X | 109 | 313 |
| C S 1-2 | 0.0001 | 0.0123 | 42.125 | −35.0705 | 0.26 | X | 103 | 295 |
| C S 1-3 | 0.0002 | 0.0168 | 47.923 | −43.1587 | 1.148 | X | 87 | 279 |
| C S 1-4 | 0.0002 | 0.022 | 59.9225 | −53.6032 | 0.666 | X | 94 | 257 |

TABLE 1-continued

| | | | | | | | | |
|---|---|---|---|---|---|---|---|---|
| C S 1-5 | 0.0002 | 0.0195 | 74.71 | −69.2207 | 0.807 | X | 98 | 244 |
| C S 1-6 | 0.0006 | 0.0105 | 35.178 | −9.91072 | 0.532 | X | 112 | 342 |
| C S 1-7 | 0.0003 | 0.031 | −3.1985 | −17.6142 | 0.634 | X | 19 | 348 |
| C S 1-8 | 0.0002 | 0.0322 | 46.1685 | −2.93798 | 0.651 | X | 72 | 323 |
| C S 1-9 | 0.0006 | 0.0142 | 34.145 | 24.54992 | 2.037 | ○ (Cracks) | 36 | 426 |
| C S 1-10 | 0.0004 | 0.0107 | 44.827 | 5.80236 | 0.638 | ○ (Cracks) | 51 | 373 |
| C S 1-11 | 0.0003 | 0.711 | −81.4 | 203.709 | 0.342 | ○ (Voids) | 20 | 558 |
| C S 1-12 | 0.0004 | 0.0062 | −68.189 | 208.8004 | 1.056 | X | 19 | 573 |
| C S 1-13 | 0.001 | 0.0237 | −27.009 | 206.6404 | 0.781 | X | 23 | 497 |
| C S 1-14 | 0.0226 | 0.0217 | −0.436 | 163.2699 | 2.932 | ○ (C&V) | 15 | 494 |
| C S 1-15 | 0.0005 | 0.0105 | 7.137 | 165.0037 | 2.36 | ○ (Cracks) | 31 | 546 |

(Note)
CS: Comparative Sample,
WM: Welding Method,
F1: Formula 1,
F2: Formula 2,
F3: Formula 3,
YS: Yield Strength,
and C&V: Cracks and Voids

TABLE 2

| NO. | WM | C | Si | Mn | P + S | Cr | Ni | Mo + W + Co | Al | Ti | Nb + V |
|---|---|---|---|---|---|---|---|---|---|---|---|
| IS 1-1 | FCAW | 0.72 | 0.38 | 7.76 | 0.012 | 0.011 | 25.8 | 0.018 | 0.031 | 0.061 | 0.025 |
| IS 1-2 | FCAW | 0.45 | 0.41 | 22.7 | 0.008 | 0.013 | 25.1 | 4.23 | 0.011 | 0.038 | 0.037 |
| IS 1-3 | SAW | 0.75 | 0.33 | 14.7 | 0.014 | 0.011 | 23.4 | 1.13 | 0.19 | 0.321 | 0.018 |
| IS 1-4 | FCAW | 0.43 | 0.41 | 16.4 | 0.01 | 0.012 | 32.6 | 9.02 | 0.013 | 0.454 | 0.026 |
| IS 1-5 | FCAW | 0.23 | 0.96 | 4.66 | 0.008 | 0.012 | 32.8 | 0.034 | 0.02 | 0.028 | 0.86 |
| IS 1-6 | SAW | 0.35 | 0.4 | 5.62 | 0.029 | 5.47 | 33.7 | 0.48 | 0.022 | 0.053 | 0.02 |
| IS 1-7 | SAW | 0.45 | 0.49 | 10.4 | 0.01 | 0.013 | 32.8 | 3.93 | 0.02 | 0.181 | 0.023 |
| IS 1-8 | SAW | 0.08 | 0.55 | 4.26 | 0.008 | 0.02 | 43.8 | 5.92 | 0.011 | 0.661 | 0.028 |
| IS 1-9 | FCAW | 0.45 | 0.44 | 4.79 | 0.02 | 0.016 | 31.2 | 2.04 | 0.019 | 0.083 | 0.022 |
| IS 1-10 | FCAW | 0.47 | 0.63 | 5.34 | 0.008 | 0.02 | 37.1 | 0.06 | 0.026 | 0.092 | 0.12 |
| IS 1-11 | FCAW | 0.41 | 0.45 | 4.51 | 0.01 | 0.015 | 30.7 | 1.46 | 0.016 | 0.064 | 0.012 |
| IS 1-12 | FCAW | 0.05 | 0.73 | 6.16 | 0.01 | 3.89 | 48.3 | 7.62 | 0.057 | 0.033 | 0.014 |
| IS 1-13 | FCAW | 0.82 | 0.24 | 4.63 | 0.012 | 0.25 | 46 | 0.56 | 0.006 | 0.86 | 0.714 |
| IS 1-14 | FCAW | 0.4 | 0.50 | 0.51 | 0.01 | 3.0 | 24.3 | 4.2 | 0.01 | 0.01 | 0.01 |

| NO. | B | N | F1 | F2 | F3 | Cracks Voids | $CVN_{@-196°\,C.}$ | YS |
|---|---|---|---|---|---|---|---|---|
| IS 1-1 | 0.0002 | 0.011 | 34.803 | 31.92513 | 0.472 | X | 91 | 362 |
| IS 1-2 | 0.008 | 0.0119 | 23.614 | 31.27239 | 0.459 | X | 77 | 385 |
| IS 1-3 | 0.0002 | 0.0041 | 18.088 | 73.96363 | 0.841 | X | 39 | 445 |
| IS 1-4 | 0.0002 | 0.004 | 11.398 | 124.404 | 0.877 | X | 41 | 523 |
| IS 1-5 | 0.0003 | 0.0112 | 0.507 | 1.49116 | 0.998 | X | 42 | 376 |
| IS 1-6 | 0.0002 | 0.0134 | 2.513 | 42.5085 | 0.475 | X | 39 | 439 |
| IS 1-7 | 0.0003 | 0.0116 | 32.357 | 46.72259 | 0.691 | X | 65 | 436 |
| IS 1-8 | 0.0002 | 0.008 | 29.811 | 79.4874 | 1.222 | X | 64 | 461 |
| IS 1-9 | 0.0003 | 0.1239 | 37.575 | 23.78488 | 0.542 | X | 53 | 448 |
| IS 1-10 | 0.001 | 0.0144 | 45.552 | 0.3364 | 0.748 | X | 41 | 391 |
| IS 1-11 | 0.0005 | 0.2096 | 39.444 | 12.25855 | 0.53 | X | 77 | 498 |
| IS 1-12 | 0.0006 | 0.0217 | 19.413 | 45.7037 | 0.82 | X | 44 | 470 |
| IS 1-13 | 0.0005 | 0.0149 | 1.27 | 143.7459 | 1.106 | X | 33 | 521 |
| IS 1-14 | 0.0001 | 0.0102 | 0.91 | 75.9302 | 0.52 | X | 34 | 510 |

(Note)
IS: Inventive Sample,
WM: Welding Method,
F1: Formula 1,
F2: Formula 2,
F3: Formula 3,
and YS: Yield Strength Referring to Tables 1 and 2, inventive samples satisfying alloying component contents and formulas of the present disclosure did not have cracks or voids, and the impact toughness values of the inventive samples were 27 J or greater at an extremely low temperature of −196° C. and the yield strength values of the inventive samples were 360 MPa or greater at room temperature.

However, comparative samples were inferior to the inventive samples in at least one of the evaluation items: the presence of cracks or voids, impact toughness, and yield strength.

Example 2

Flux cored arc welding materials having compositions shown in Table 3 were prepared. In Table 3, the content of each component is given in wt %.

Inventive samples and comparative samples having the same outer sheath structure and composition but different welding material compositions were prepared. The outer sheath of each welding material includes, by wt %, nickel (Ni): 35% to 46%, other impurities: 0.05% or less, and the balance of iron (Fe).

A FCAW process was performed using each welding material.

In the FCAW process, welding was performed at a heat input rate of 1.7 KJ/mm under conditions of 100% $CO_2$. A FCAW wire having a diameter of 1.2 mm was used.

Thereafter, weldability, the presence of cracks or voids in welded joints, impact toughness at −196° C., and yield strength at room temperature were observed or measured, and results of the observation or measurement are shown in Table 1. In Table 3, impact toughness values (CVN) are given in joules (J), and yield strength values are given in MPa. In addition, components written using the symbol "+" indicate that at least one selected from the components is included in the samples.

TABLE 3

| NO. | C | Si | Mn | P + S | Cr | Ni | Mo + W + Co | Al | Ti | Nb + V | N |
|---|---|---|---|---|---|---|---|---|---|---|---|
| CS 2-1 | 0.08 | 0.4 | 1 | 0.021 | — | 31 | — | — | — | — | — |
| CS 2-2 | 0.05 | 2.2 | 0.9 | 0.018 | — | 35 | — | — | — | — | — |
| CS 2-3 | 0.05 | 2.2 | 0.9 | 0.018 | — | 35 | — | — | — | — | — |
| CS 2-4 | 0.05 | 0.9 | 0.9 | 0.017 | — | 43 | — | — | — | — | — |
| CS 2-5 | 0.02 | 0.9 | 5 | 0.021 | — | 34 | — | — | — | 1.5 | — |
| CS 2-6 | 0.51 | 0.9 | 0.9 | 0.022 | — | 35 | — | — | — | — | — |
| CS 2-7 | 0.51 | 0.9 | 0.9 | 0.022 | — | 35 | — | — | — | — | — |
| CS 2-8 | 0.8 | 2.5 | 9 | 0.027 | — | 28 | — | — | — | — | — |
| CS 2-9 | 0.6 | 0.9 | 14 | 0.049 | — | 37 | 2 | — | — | — | — |
| CS 2-10 | 1.2 | 0.9 | 8 | 0.024 | 14 | 34 | 2 | — | — | — | — |
| CS 2-11 | 1.2 | 0.9 | 8 | 0.024 | 14 | 34 | 2 | — | — | — | — |
| CS 2-12 | 0.8 | 0.8 | 10 | 0.031 | 5 | 35 | 15 | — | 0.5 | — | — |
| CS 2-13 | 0.9 | 1.3 | 35 | 0.025 | — | 40 | 5 | 1.5 | 2.5 | — | 0.7 |
| CS 2-14 | 1.5 | 0.7 | 10 | 0.021 | — | 45 | 1.5 | 2.5 | 1.5 | 0.3 | — |
| IS 2-1 | 0.8 | 0.7 | 9 | 0.022 | — | 28 | — | — | — | — | — |
| IS 2-2 | 0.6 | 0.7 | 25 | 0.019 | — | 27 | 5 | — | — | — | — |
| IS 2-3 | 0.6 | 0.9 | 20 | 0.023 | — | 34 | 10 | 1.5 | 1 | — | — |
| IS 2-4 | 0.3 | 1.8 | 6 | 0.018 | — | 35 | — | — | — | 0.3 | — |
| IS 2-5 | 0.5 | 0.8 | 6 | 0.031 | — | 34 | 3 | — | — | — | 0.2 |
| IS 2-6 | 0.6 | 0.9 | 8 | 0.019 | — | 39 | — | — | — | 0.5 | — |
| IS 2-7 | 0.6 | 0.9 | 6 | 0.023 | — | 32 | 2 | 1 | — | — | 0.5 |
| IS 2-8 | 0.06 | 1.1 | 9 | 0.021 | 5 | 50 | 4 | — | — | — | — |
| IS 2-9 | 1.3 | 0.3 | 3 | 0.024 | — | 48 | 1 | — | 2.4 | 1.2 | — |
| IS 2-10 | 0.05 | 0.5 | 9 | 0.018 | 10 | 25 | 3 | — | — | — | — |
| IS 2-11 | 0.08 | 0.5 | 0.5 | 0.021 | — | 31 | 5 | — | — | — | — |
| IS 2-12 | 0.08 | 0.5 | 2 | 0.021 | — | 31 | 5 | — | — | — | — |

| NO. | $TiO_2$ | $SiO_2$ + $ZrO_2$ + $Al_2O_3$ | K + Na + Li | F + Ca | Weldability | Cracks Voids | CVN@ −196° C. | YS |
|---|---|---|---|---|---|---|---|---|
| CS 2-1 | 4.5 | — | 0.1 | — | Good | X | 103 | 295 |
| CS 2-2 | 4.5 | — | 0.1 | — | Good | X | 87 | 279 |
| CS 2-3 | 6.5 | — | 0.1 | 1.2 | Poor | — | — | — |
| CS 2-4 | 8.0 | — | 0.1 | 0.1 | Good | X | 94 | 257 |
| CS 2-5 | 8.7 | 2 | 0.1 | 0.1 | Good | X | 19 | 348 |
| CS 2-6 | 9 | 2 | 1 | — | Good | X | 72 | 323 |
| CS 2-7 | 3.2 | 4 | 1.6 | 0.2 | Poor | — | — | — |
| CS 2-8 | 5 | 4 | 1 | 0.5 | Good | ○ (Craks) | 36 | 426 |
| CS 2-9 | 5 | 6 | 0.5 | 0.5 | Good | ○ (Craks) | 51 | 373 |
| CS 2-10 | 5 | 6 | 0.5 | 0.5 | Good | X | 19 | 573 |
| CS 2-11 | 7 | 8 | 0.1 | 0.5 | Poor | — | — | — |
| CS 2-12 | 7 | 1 | 0.1 | — | Good | X | 23 | 497 |
| CS 2-13 | 10 | 1 | 0.1 | 0.2 | Good | ○ (Craks, Voids) | 15 | 494 |
| CS 2-14 | 13 | 1 | 0.1 | 0.2 | Good | ○ (Craks) | 31 | 546 |
| IS 2-1 | 4.5 | — | 0.1 | 0.1 | Good | X | 91 | 362 |
| IS 2-2 | 6.5 | — | 0.1 | — | Good | X | 77 | 385 |
| IS 2-3 | 8 | 1 | 0.3 | — | Good | X | 41 | 523 |

TABLE 3-continued

| IS 2-4 | 9 | 1 | 0.1 | 0.4 | Good | X | 42 | 376 |
| IS 2-5 | 10 | — | 1.3 | 0.4 | Good | X | 53 | 448 |
| IS 2-6 | 5 | 2 | 0.5 | 0.7 | Good | X | 41 | 391 |
| IS 2-7 | 13 | — | 0.2 | 0.7 | Good | X | 77 | 498 |
| IS 2-8 | 12 | 5 | 0.1 | 1 | Good | X | 44 | 470 |
| IS 2-9 | 7.5 | 7 | 0.1 | — | Good | X | 33 | 521 |
| IS 2-10 | 4.5 | 2 | 0.4 | — | Good | X | 87 | 371 |
| IS 2-11 | 14 | — | 0.1 | — | Good | X | 98 | 373 |
| IS 2-12 | 8 | — | 0.1 | — | Good | X | 76 | 382 |

(Note)
CS: Comparative Sample,
IS: Inventive Sample,
and YS: Yield Strength

Referring to Table 1, the inventive samples having alloying components according to the present disclosure had good weldability and did not have cracks or voids, and the impact toughness values of the inventive samples were 27 J or greater at an extremely low temperature of −196° C. and the yield strength values of the inventive samples were 360 MPa or greater at room temperature.

However, the comparative samples were inferior to the inventive samples in at least one of the evaluation items: weldability, the presence of cracks or voids, impact toughness, and yield strength. The comparative samples were determined as not being suitable as a welding material.

Example 3

Submerged and gas metal arc welding materials having compositions shown in Table 4 were prepared. In Table 4, the content of each component is given in wt %.

Inventive samples and comparative samples having the same outer sheath structure and composition but different welding material compositions were prepared.

Comparative samples 3-1, 3-3, and 3-4, Inventive samples 3-1, 3-3, 3-4, 3-5, 3-6, 3-7, and 3-9 each had a single outer sheath structure formed by a high Ni steel outer sheath. The high Ni steel outer sheath had, by wt %, nickel (Ni): 35% to 46%, other impurities: 0.05% or less, and the balance of iron (Fe). Comparative sample 3-2 and Inventive samples 3-2 and 3-8 each had a dual outer sheath structure formed by a high Ni steel outer sheath and a low carbon steel outer sheath. The high Ni steel outer sheath had, by wt %, nickel (Ni): 35% to 46%, other impurities: 0.05% or less, and the balance of iron (Fe). The low carbon steel outer sheath had, by wt %, carbon (C): 0.025% or less, manganese (Mn): 0.025% or less, and the balance of iron (Fe) and inevitable impurities.

SAW and GMAW processes were performed using each welding material.

In the SAW process, welding was performed at a heat input rate of 2.4 KJ/mm to 3.0 KJ/mm. A SAW wire having a diameter of 4.0 mm was used.

In the GMAW process, welding was performed at a heat input rate of 1.7 KJ/mm under conditions of 80% Ar+20% $CO_2$. A GMAW wire having a diameter of 1.2 mm was used.

Thereafter, the presence of cracks or voids in welded joints, impact toughness at −196° C., and yield strength were observed or measured, and results of the observation or measurement are shown in Table 4. In table 4, impact toughness values (CVN) are given in joules (J), and yield strength values are given in MPa. In addition, components written using the symbol "+" indicate that at least one selected from the components is included in the samples.

TABLE 4

| NO. | C | Si | Mn | P + S | Cr | Ni | Mo + W + Co | Al | Nb + V | N | Cracks Voids | $CVN_{@-196° C.}$ (SA/GMA) | Yield strength (SA/GMA) |
|---|---|---|---|---|---|---|---|---|---|---|---|---|---|
| CS 3-1 | 0.02 | 0.7 | 0.5 | 0.016 | — | 23 | — | — | — | — | X | 109/121 | 313/323 |
| CS 3-2 | 0.05 | 0.7 | 2 | 0.03 | — | 51 | — | — | — | — | X | 98/112 | 244/264 |
| CS 3-3 | 0.5 | 0.6 | 15 | 0.01 | — | 24 | — | — | — | — | X | 112/124 | 342/352 |
| CS 3-4 | 0.8 | 0.25 | 5 | 0.01 | — | 28 | 12 | — | 1.8 | 0.7 | O (Voids) | 20/27 | 558/582 |
| IS 3-1 | 0.35 | 0.5 | 7 | 0.03 | 5.5 | 33 | 0.5 | — | — | — | X | 39/45 | 439/451 |
| IS 3-2 | 0.9 | 0.7 | 3 | 0.01 | — | 35 | — | — | — | — | X | 63/73 | 378/394 |
| IS 3-3 | 0.05 | 1.2 | 8 | 0.01 | 2 | 39 | 5 | — | 0.5 | 0.5 | X | 32/46 | 452/472 |
| IS 3-4 | 0.3 | 0.5 | 6 | 0.01 | 3 | 43 | — | — | — | — | X | 83/94 | 392/403 |
| IS 3-5 | 0.7 | 0.3 | 6 | 0.015 | — | 25 | — | — | — | — | X | 89/94 | 382/402 |
| IS 3-6 | 0.5 | 0.49 | 11 | 0.01 | — | 35 | 4 | — | — | 0.01 | X | 65/73 | 436/442 |
| IS 3-7 | 1.2 | 0.6 | 10 | 0.03 | — | 35 | — | 1.5 | — | — | X | 33/36 | 453/487 |
| IS 3-8 | 0.1 | 0.55 | 5 | 0.01 | — | 45 | 6 | — | 1.5 | — | X | 64/71 | 461/471 |
| IS 3-9 | 0.8 | 0.33 | 15 | 0.015 | — | 25 | 1.5 | 0.2 | — | — | X | 39/43 | 445/465 |

(Note)
CS: Comparative Sample,
and IS: Inventive Sample

Referring to Table 4, the inventive samples having alloying components according to the present disclosure had good weldability and did not have cracks or voids, and the impact toughness values of the inventive samples were 27 J or greater at an extremely low temperature of −196° C. and the yield strength values of the inventive samples were 360 MPa or greater at room temperature.

However, the comparative samples were inferior to the inventive sample in at least one selected of the evaluation items: the presence of cracks or voids, impact toughness, and yield strength. The comparative samples were determined as not being suitable as a welding material.

The invention claimed is:

1. A welded joint of extremely low temperature steel, the welded joint comprising, by wt %, carbon (C): 0.05% to 1.30%, silicon (Si): 0.2% to 1.8%, manganese (Mn): 0.4% to 23%, chromium (Cr): 0.01% to 12%, nickel (Ni): 23% to 49%, at least one selected from molybdenum (Mo), cobalt (Co), and tungsten (W): 0.01% to 10%, aluminum (Al): 0.2% or less (excluding 0%), titanium (Ti): 0.9% or less (excluding 0%), at least one selected from niobium (Nb) and vanadium (V): 0.9% or less, at least one selected from sulfur (S) and phosphorus (P): 0.035% or less (excluding 0%), and the balance of iron (Fe) and inevitable impurities, wherein the at least one selected from molybdenum (Mo), cobalt (Co), and tungsten (W) (expressed as "Mo+W+Co"), the at least one selected from niobium (Nb) and vanadium (V) (expressed as "Nb+V"), and the nickel (Ni), chromium (Cr), aluminum (Al), and titanium (Ti) satisfy Formula 1 below:

1.5Ni-8Cr-2.5(Mo+W+Co)-20Al-29Ti-55(Nb+V)≥0.   (Formula 1)

2. The welded joint of claim 1, wherein the at least one selected from molybdenum (Mo), cobalt (Co), and tungsten (W) (expressed as "Mo+W+Co"), the at least one selected from niobium (Nb) and vanadium (V) (expressed as "Nb+V"), and the nickel (Ni), chromium (Cr), aluminum (Al), and titanium (Ti) further satisfy Formula 2 below:

98.5C-1.08Mn+9.73Cr-1.52Ni+10.3(Mo+W+Co)+122Ti+34.7(Nb+V)≥0.   (Formula 2)

3. The welded joint of claim 1, wherein the silicon (Si), aluminum (Al), and titanium (Ti) satisfy Formula 3 below:

Si+Al+Ti≤2.0.   (Formula 3)

4. The welded joint of claim 1, wherein the welded joint has an impact toughness of 27 J or greater at an extremely low temperature of −196° C.

5. The welded joint of claim 1, wherein the welded joint has a yield strength of 360 MPa or greater at room temperature.

6. The welded joint of claim 1, further comprising, by wt %, one or more of nitrogen (N): 0.001% to 0.6% and boron (B): 0.0001% to 0.008%.

7. The welded joint of claim 6, wherein the at least one selected from molybdenum (Mo), cobalt (Co), and tungsten (W) (expressed as "Mo+W+Co"), the at least one selected from niobium (Nb) and vanadium (V) (expressed as "Nb+V"), and the nickel (Ni), chromium (Cr), aluminum (Al), and titanium (Ti) further satisfy Formula 2 below:

98.5C-1.08Mn+9.73Cr-1.52Ni+10.3(Mo+W+Co)+122Ti+34.7(Nb+V)≥0.   (Formula 2)

8. The welded joint of claim 6, wherein the silicon (Si), aluminum (Al), and titanium (Ti) satisfy Formula 3 below:

Si+Al+Ti≤2.0.   (Formula 3)

9. The welded joint of claim 6, wherein the welded joint has an impact toughness of 27 J or greater at an extremely low temperature of −196° C.

* * * * *